Nov. 3, 1936.  J. Y. SCOTT ET AL  2,059,753
UNIVERSAL INDEX HEAD
Filed Oct. 28, 1935  4 Sheets-Sheet 1
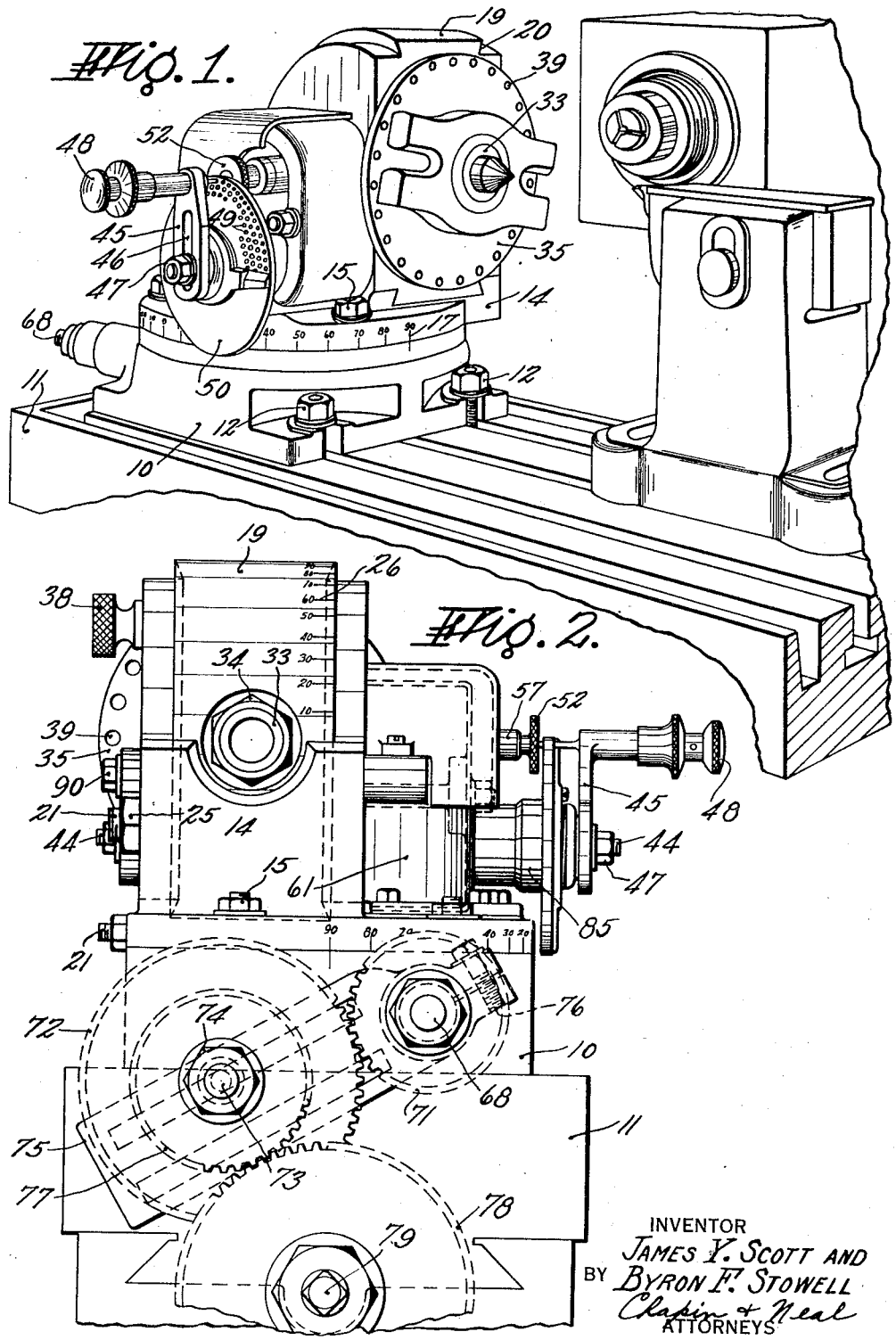
INVENTOR
JAMES Y. SCOTT AND
BY BYRON F. STOWELL
Chapin + Neal
ATTORNEYS

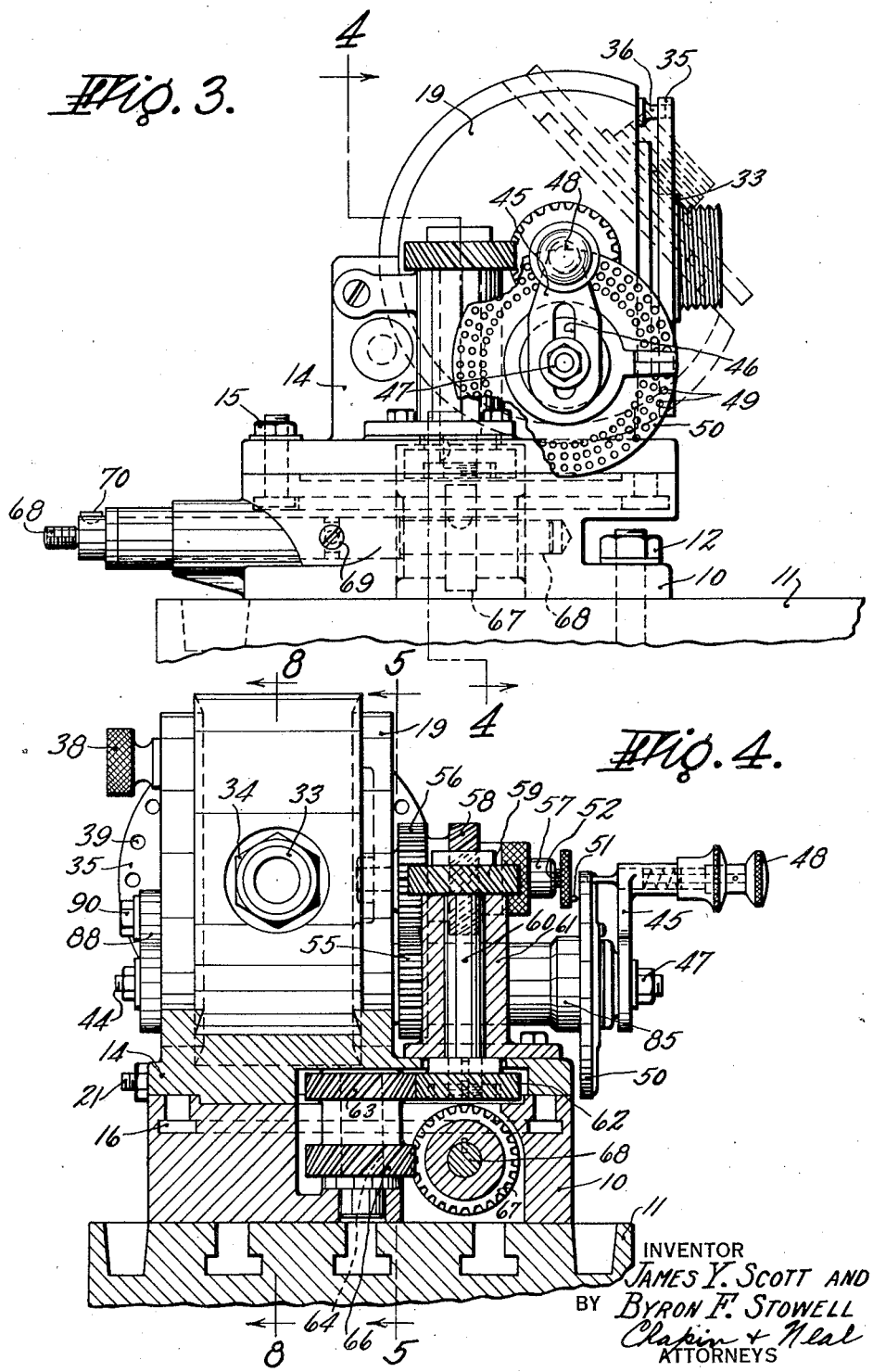

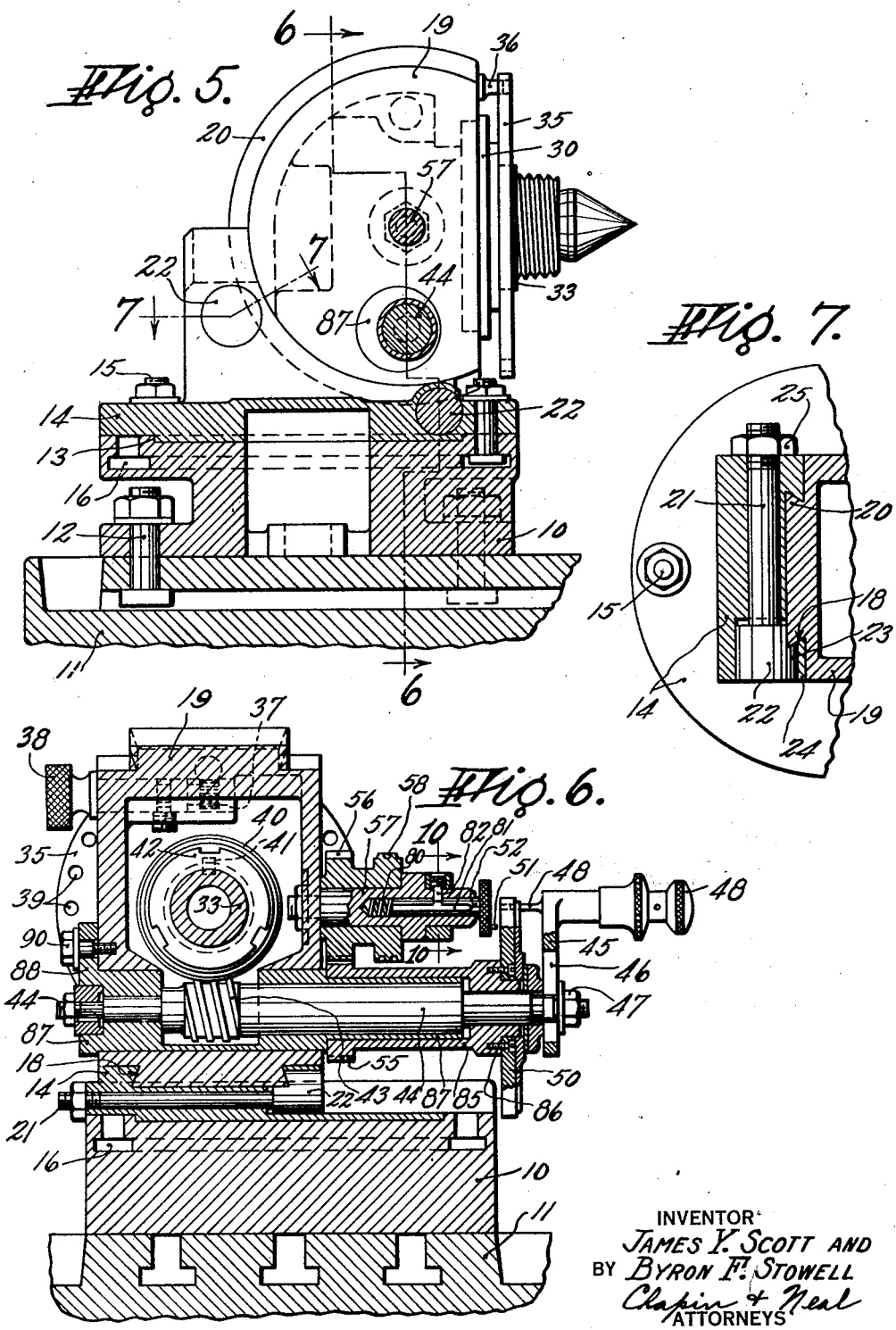

Nov. 3, 1936.  J. Y. SCOTT ET AL  2,059,753
UNIVERSAL INDEX HEAD
Filed Oct. 28, 1935  4 Sheets-Sheet 4
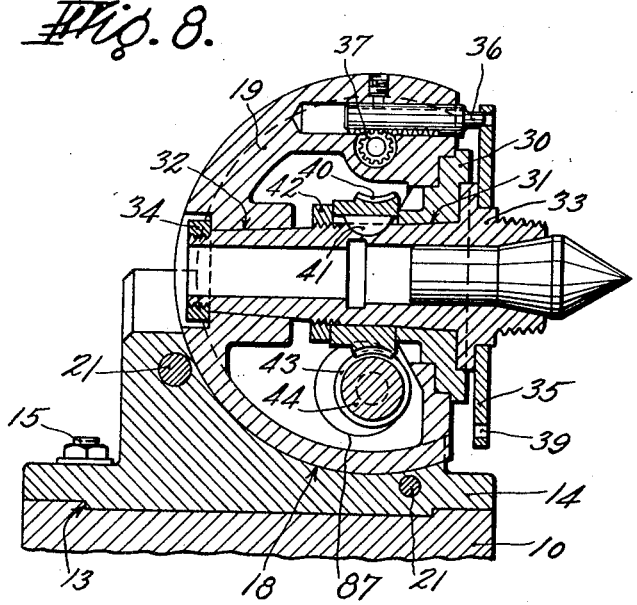
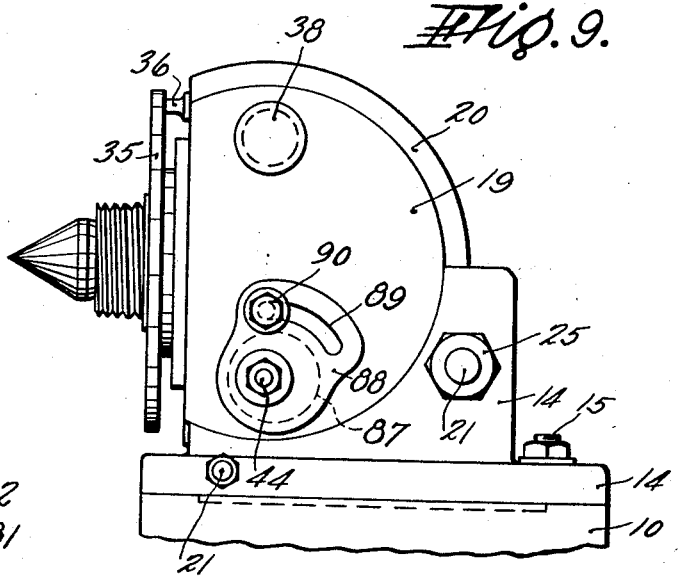
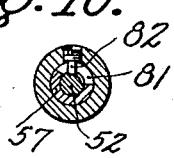
INVENTOR
JAMES Y. SCOTT AND
BY BYRON F. STOWELL
Chapin & Neal
ATTORNEYS Patented Nov. 3, 1936

2,059,753

UNITED STATES PATENT OFFICE 2,059,753

UNIVERSAL INDEX HEAD

James Y. Scott and Byron F. Stowell, Springfield, Mass., assignors to Van Norman Machine Tool Company, Springfield, Mass., a corporation of Massachusetts Application October 28, 1935, Serial No. 47,070

3 Claims. (Cl. 90—57)

This invention relates to index or dividing heads adapted to support a work piece in any desired position on the table of a machine tool such as a milling machine. Prior index heads of this character have been in long use, but have been restricted in their adjustability, particularly when it was desired to operate the work carrying spindle of the index head by positive gearing from the bed traversing mechanism of the machine tool. It is one object of the present invention to provide an index head which will possess universal angular adjustability, and in which the work carrying spindle can be rotated either manually or by power in any position to which it may be adjusted. A further object is to provide an index head of this character which is capable of use with standard forms of power drive for the work carrying spindle. Additional objects will appear from the following description and claims.

Referring to the drawings:

Fig. 1 is a perspective view of the improved dividing or index head mounted in place on the bed of a milling machine;

Fig. 2 is a rear end view of the index head;

Fig. 3 is a side view of the head;

Fig. 4 is a section on line 4—4 of Fig. 3;

Fig. 5 is a section on line 5—5 of Fig. 4;

Fig. 6 is a section on line 6—6 of Fig. 5;

Fig. 7 is a section on line 7—7 of Fig. 5;

Fig. 8 is a section on line 8—8 of Fig. 4;

Fig. 9 is a detail looking in the opposite direction from Fig. 5; and

Fig. 10 is a section on line 9—9 of Fig. 4.

The index head is mounted on a base 10, provided with suitable slots or holes to permit its attachment to the bed 11 of a milling machine by bolts 12. The base 10 is provided with a circular seat 13, best shown in Fig. 5, upon which rests a bearing member 14. The latter member is fitted with holes through which pass bolts 15 engaging annular T-slots 16 in the base 10 so that the bearing member may be secured in any desired position of rotation. Graduations 17 (Fig. 1) on the bearing member and the base serve to indicate the angle at which the member is positioned.

The bearing member is provided with an upwardly extending portion in which are formed opposed dovetail shoulders 18 which receive a swivel head 19, the latter having a dovetail 20 formed on it to interfit with the shoulders 18. Bolts 21 (Fig. 7) pass through the bearing member at intervals, and are provided with heads 22 having angular portions 23. The engagement of the angular portions 23 with the dovetail 18 causes pressure to be exerted on a gib 24 when the nuts 25 are tightened, so that the swivel head can be clamped in any desired position without any lost motion. Graduations 26 (Fig. 2) on the swivel head and the bearing member serve to indicate the angle at which the swivel head is positioned. It will be understood from the drawings that the bearing member rotates on the base in a horizontal plane whereas the swivel head rotates on the bearing member in a vertical plane. The combination of the two movements permits the work mounting part of the index head to be located in any desired angular position, as will more fully appear later.

The swivel head is provided with a bearing 30 (Fig. 8) suitably secured in place, in which is formed a tapered hole 31. A second tapered hole 32 is formed in the head itself, the two forming spaced bearings in which a spindle 33 may rotate. The spindle is held against coming out in one direction by the taper of the holes, and in the other direction by a nut 34. An index plate 35 is secured frictionally or otherwise to the spindle, and when the spindle is disconnected from its driving means as will be described below serves to locate the spindle in any desired position of rotation. On the upper side of the swivel head is a locking pin 36 reciprocated by a pinion 37 meshing with rack teeth formed on the pin and adapted to be rotated by a handle 38 (Fig. 2). When the pin is projected it engages with the usual holes 39 formed in the index plate.

When the spindle is to be rotated by the usual indexing mechanism the following parts are brought into use. A worm wheel 40 (Fig. 8) is secured to the spindle by a key 41 and a nut 42. Below the worm wheel, and in normal engagement with it, is a worm 43 carried by a shaft 44 the mounting for which will be described below. An operating handle 45 is provided with a slot 46 by which it engages flattened sides of the shaft 44, and is held in position on the shaft by a nut 47. The handle carries the usual retractable pin 48 which engages within holes 49 of the usual indexing plate 50, the details of which need not be gone into here. The plate 50 is held in position while indexing is going on by a pin 51 mounted on a spring pressed plunger 52. By turning the handle 45 the spindle can be rotated an amount determined by the customary operation of the indexing means.

It is also desirable in many cases, as when cutting spirals, to rotate the spindle in timed relation to the forward and back motion of the bed 11. Such motions have been used heretofore, but they have been restricted to a position of the spindle with its axis parallel to the line of motion of the bed. By the construction about to be described this power rotation of the spindle can be carried on no matter in what position the axis of the spindle may be set. Operation of the spindle by the handle 45 is of course suspended in this case, it only being necessary to disengage the pin 51 from the index plate 50 and thus to permit the plate and the handle to rotate together, they being coupled by the engagement of pin 48 with one of the holes in the index plate. For power rotation of the spindle the same worm and worm wheel drive described above is used, but instead of the shaft 44 being rotated by hand its rotation is derived from a gear 55 (Figs. 4 and 6). This gear meshes with a similar gear 56 mounted on a stud 57 (Fig. 6) mounted on the swivel head 19 with its axis intersecting the axis of the spindle so that as the swivel head is rotated from one position of adjustment to another the shaft 57 and the gears mounted thereon will not change their relative positions with respect to the bearing member 14. The gear 56 has fixed to it a helical gear 58 meshing with a helical gear 59 on a vertical shaft 60, journaled within a bracket 61 mounted upon the bearing member. A helical gear 62 (Fig. 4) on the lower end of this latter shaft meshes with a helical gear 63 on a vertical shaft 64 mounted in the base 10, and so positioned that the axis of the gear 63 will be coincident with the axis of rotation of the bearing member on the base 10. A second helical gear 66 fixed to the gear 63 meshes with a helical gear 67 on a horizontal shaft 68 by which power from the bed feed screw is obtained in a manner to be described.

Before continuing with the description of the drive gearing, the purpose of the relations of the several shafts and gears above referred to will be discussed. The general arrangement of gearing is such that operative connection with the power drive will be maintained no matter in what adjusted position the swivel head 19 is placed. The worm 43, the gear 55, and the stud 57 with the gears 56 and 58 upon it are all mounted on the swivel head, so that they are of course unaffected by its adjustment in their operative relation to the worm wheel 40 on the spindle. Due to the fact that the axis of the stud 57 intersects the axis of the spindle and is so positioned that it passes through the center of rotation of the swivel head 19 in the dovetailed ways 18, it possesses no motion of translation during the adjustment of the swivel head, the shaft merely rotating on its axis. Assuming the gear 59 to be stationary during this adjustment of the swivel head the gear 58 will also be held stationary by their mutual engagement, and the spindle will be rotated in the swivel head as the latter is adjusted. This motion is unimportant since no operaion is being performed on the work while the adjustment is taking place, the only thing to be considered being that the engagement between the gears 58 and 59 is unaffected. If the bearing member 14 is swung around on the seat 13 the gear 62 is caused to execute a planetary movement around the gear 63, but as the axis of the latter gear is coincident with that of the seat 13 the engagement of the gears is unaffected in this case as well. It will be apparent that no matter in what position the spindle is placed by adjustment of the swivel head or the bearing member, the spindle can be rotated by the described power gearing with equal facility. This result has not heretofore been attained as far as we are aware.

The power drive from the bed feed screw is obtained in a generally conventional manner which will be described briefly for completeness. The shaft 68 is held against axial movement by a stop pin 69 (Fig. 3), and bears at its end a key 70. On this keyed end of the shaft is a gear 71 (Fig. 2) forming one element of a change gear mechanism of the usual type. The intermediate gear 72 is carried on a shaft 73 secured as by a nut 74 on a slotted arm 75. This arm is secured to the bearing adjacent the end of the shaft 68 by a clamp screw 76 in any desired position of adjustment. The shaft 73 also carries a pinion 77 which meshes with a gear 78 on the bed feed screw shaft 79.

In order to convert the head from manual operation to power operation or the reverse, it is necessary to be able to hold the index plate 50 in fixed position by means of the pin 51 or to release this pin so that the plate can be rotated freely by the power drive, the plate under the latter condition carrying the arm 45 and consequently the shaft 44 around with it by reason of the engagement of the pin 48 with the holes in the plate. Some means for holding the locking pin 51 retracted is therefore necessary. In the present case the pin 51 is carried on a plunger 52 mounted in an axial hole formed in the stud 57 and pressed outwardly by a spring 80. The plunger 52 is formed with a slot 81 adapted to be engaged by a radially extending pin 82. The main part of the slot is parallel to the axis of the plunger and is somewhat larger than the pin so as to give some latitude in the position of the pin 51, this assisting in positioning the pin within the holes in the index plate 50. A part of the slot, however, extends at right angles to this longitudinal portion, and when the plunger is pushed back against the spring and rotated it will be held in the position of Fig. 6 in which the pin 51 is held retracted from engagement with the index plate.

The gear 55 is formed integral with, or is fixed to, a sleeve 85 to which the index plate 50 is secured as by screws 86. This sleeve rotates on a member 87 which also serves as a bearing for the shaft 44 carrying the worm 43. As is best shown in Fig. 9, the member 87 is eccentrically mounted within the swivel head 19, and carries at one end an extension 88 provided with a slot 89 which embraces a stud 90. By loosening the stud 90 and swinging the extension 88 the shaft 44 is caused to move either into or out of a position in which the worm 43 will be in engagement with the worm wheel 40. The disengagement of the worm from the worm wheel is of utility in case it is desired to control the position of the spindle by the index plate 35.

Any desired form of work support on the spindle may be provided depending upon the type of operation which is to be performed. In the drawings we have shown a center of the usual type, upon which the work can be rotated by the usual lathe type of dog. For angular positions of the work spindle, however, some usual form of chuck would be substituted. Such a chuck forms no part of the present invention, and as its use is customary in milling machine practice it has not been illustrated.

What we claim is:

1. A universal dividing head comprising power engaging means, a base adapted for mounting on a milling machine table, a housing pivotally mounted on said base for adjustable movement about a vertical axis, a head pivotally mounted in said housing for adjustable movement about a horizontal axis, a work supporting spindle rotatably mounted in said head, a vertical shaft in said base and in gear connection with said power means, a second vertical shaft in gear connection with the first named shaft, and gear connecting mechanism between the second named shaft and the spindle whereby the spindle may be rotated, when set angularly on either of said axes.

2. A universal dividing head comprising power engaging means including a horizontal shaft, a base in which said shaft is journaled, a housing adjustably mounted on the base for pivotal movement about a vertical axis, a head adjustably mounted in the housing for pivotal movement about a horizontal axis, a work supporting spindle mounted for rotation in said head, a gear on said spindle, a vertical shaft in gear connection with said horizontal shaft, a second vertical shaft in gear connection with the first named vertical shaft, and mechanism connecting the head gear and second named vertical shaft for rotary movement of the spindle.

3. A dividing head for milling machines comprising a base adapted for mounting on the milling machine table, a vertical shaft supported in the base, a gear on said shaft, a housing pivotally supported on the base for adjustable movement about the axis of said shaft, a vertically disposed shaft in said housing, a gear on said shaft and being adapted for a pivotal movement of its axis about the axis of the first named shaft whereby the said gears may continue in operative mesh, a head member pivotally supported in the housing for adjustable movement on an axis angularly to that of the housing, a rotatable work supporting spindle journaled in the head member, a worm gear on said spindle, a worm shaft and worm connecting the worm gear, mechanism operatively connecting the worm shaft and the second named shaft, and means for rotating the first named shaft.

JAMES Y. SCOTT.
BYRON F. STOWELL.